US008433629B2

(12) United States Patent
Murtaugh et al.

(10) Patent No.: US 8,433,629 B2
(45) Date of Patent: *Apr. 30, 2013

(54) COMMISSION MANAGEMENT SYSTEM

(75) Inventors: Jeanne L. Murtaugh, Greensboro, NC (US); Kevin Ruebenstahl, Old Greenwich, CT (US); Paul A. Pricoli, Holmdel, NJ (US); Michael Will De Laforcade, East Patchogue, NY (US)

(73) Assignee: Convergex Group, LLC, New York, NY (US)

( * ) Notice: Subject to any disclaimer, the term of this patent is extended or adjusted under 35 U.S.C. 154(b) by 535 days.

This patent is subject to a terminal disclaimer.

(21) Appl. No.: 12/847,236

(22) Filed: Jul. 30, 2010

(65) Prior Publication Data
US 2011/0010284 A1 Jan. 13, 2011

Related U.S. Application Data

(63) Continuation of application No. 12/437,109, filed on May 7, 2009, now Pat. No. 7,769,658, which is a continuation of application No. 10/437,513, filed on May 14, 2003, now abandoned.

(60) Provisional application No. 60/378,113, filed on May 14, 2002.

(51) Int. Cl.
*G06Q 40/00* (2012.01)
(52) U.S. Cl.
USPC .............................................. 705/35; 705/37
(58) Field of Classification Search .................. None
See application file for complete search history.

(56) References Cited

U.S. PATENT DOCUMENTS

| 5,774,883 | A | 6/1998 | Andersen et al. |
| 5,850,430 | A | 12/1998 | Hamalainen |
| 5,918,218 | A | 6/1999 | Harris et al. |
| 5,974,146 | A | 10/1999 | Randle et al. |
| 6,035,287 | A | 3/2000 | Stallaert et al. |
| 6,047,268 | A | 4/2000 | Bartoli et al. |
| 6,236,972 | B1 | 5/2001 | Shkedy |
| 6,470,325 | B1 | 10/2002 | Leemhuis |
| 6,615,187 | B1 | 9/2003 | Ashenmil et al. |
| 6,615,188 | B1 | 9/2003 | Breen et al. |
| 7,103,571 | B2 | 9/2006 | Shigemi et al. |
| 7,225,150 | B2 | 5/2007 | Wilton et al. |
| 2002/0143701 | A1 | 10/2002 | Maguire et al. |
| 2002/0161723 | A1 | 10/2002 | Asokan et al. |
| 2003/0014331 | A1 | 1/2003 | Simons |
| 2003/0208441 | A1 | 11/2003 | Poplawski et al. |
| 2005/0246264 | A1 | 11/2005 | Plunkett |

OTHER PUBLICATIONS

Ambachtscheer, The soft dollar question: what is the answer? Financial Analyst Journal, Charlottesville; Jan./Feb. 1993, vol. 49, issue 1, p. 8, 3 pages.
Levitt, Speech by SEC Chairman: Remarks before the 2000 Annual Meeting Securities Industry Association, U.S. Securities & Exchange Commission, Boca Raton, Florida, Nov. 9, 2000.

(Continued)

*Primary Examiner* — Rajesh Khattar
(74) *Attorney, Agent, or Firm* — Im IP Law PLLC; C. Andrew Im

(57) ABSTRACT

The present invention relates to a commission management system and method for managing soft dollar and commission recapture services over communications network. The system and method pays the invoices from the soft dollar commission account after the client views and approves invoices online.

14 Claims, 9 Drawing Sheets

OTHER PUBLICATIONS

Soft Dollars: The Boom in Third-Party Research, Rohrer, Juli, Institutional Investor, New York Apr. 1984, vol. 18, issue 4, p. 73, 7 pages.

Commission Recapture Success, Howard J. Schwartz, Traders Magazine, New York, Oct. 1, 2000, p. 1.

Soft dollar unveiled, George Brendan, Williams, Damon, Benefits Canada, Toronto; Oct. 1998, vol. 22, issue 9, p. 51, 4 pages.

COMMISSION MANAGEMENT SYSTEM

RELATED APPLICATION

This application is a continuation application of U.S. patent application Ser. No. 12/437,109 filed May 7, 2009, now U.S. Pat. No. 7,769,658 which is a continuation application of U.S. patent application Ser. No. 10/437,513 filed May 14, 2003, now abandoned which claims priority to U.S. Provisional patent application Ser. No. 60/378,113 filed May 14, 2002, each of which is incorporated by reference in its entirety.

BACKGROUND OF THE INVENTION

The present invention relates a commission management system, more particularly a commission management system for managing soft dollar and commission recapture services.

Successful investing in stocks and bonds can be viewed very simply as a combination of buying a "good thing" and doing a good job negotiating the purchase. Since the processes of deciding what's "good" and executing the transaction well can require complex research and professional trading skills, many investors rely on professional money managers to decide the "what" and professional traders (chosen by the money manager) to handle the transaction.

Historically, many brokerage firms have provided the investor with research to aid the investment decision and trading skill to execute the transaction in return for a commission. So, as a logical construct, the commission a broker is paid has a component associated with providing research and advice to the client and a component associated with performing the trade. Research is the foundation of the money management industry. Soft dollar arrangements developed as a link between the brokerage industry's supply of research and the money management industry's demand for research.

Brokerage firms typically provide a bundle of services including research and execution of transactions. The research provided can be either proprietary or third party. Because commission dollar pay for the entire bundle of services, the practice of allocating certain of these commission dollars to pay for the research component has come to be called "soft dollars".

Since the early days of the brokerage industry, full-service brokerage firms (i.e., broker-dealers) have provided research and other services to customers in addition to executing trades as part of an overall package of services provided to customers. The costs of these services generally are not separately itemized or billed to customers of brokerage firms, but are considered part of the overall services. Customers have always paid for this in-house (or proprietary) research, as well as other services, with commissions.

As market forces and the regulations surrounding investing have evolved, some brokerage firms remain in both the advice business and the trading business. Other brokerage firms opted to focus their resources on trading expertise only, providing their clients the opportunity to purchase third-party independent research to aid their investment decisions. The cost of third-party research is more easily quantifiable than the cost of proprietary research. To be within the safe harbor of research under Section 28(2) of the Exchange Act, the research must be "provided by" the broker. The research may be delivered directly to the adviser by the third party research provider, but the broker must be obligated to pay for the research services. However, if the client, such as plan sponsors, foundations, etc., does not require or require minimal research advice or services from the brokerage firms, the client can typically recapture the advice/research portion of the commission. That is, commission recapture programs in effect permit the client, instead of the adviser, to reap the benefit of the cost of soft dollars built into the institutional brokerage commissions. However, many advisers lack centralized management or control over the receipt of products and services for soft dollars. Typically, soft dollar decision-making occurs in an uncoordinated fashion at several functional levels.

Therefore, it is desirable to have a commission management system for managing these various soft dollar and commission recapture arrangements. The commission management system of the present invention provides a centralized management and control over the receipt of products and services (i.e., research) for soft dollars.

OBJECTS AND SUMMARY OF THE INVENTION

An object of the present invention provides commission management systems for managing soft dollar and commission recapture services.

It is an additional object of the present invention to provide the commission management system as aforesaid over a communication network accessible by advisers and client.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the specific concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DESCRIPTION OF THE EMBODIMENTS

Figure 1:
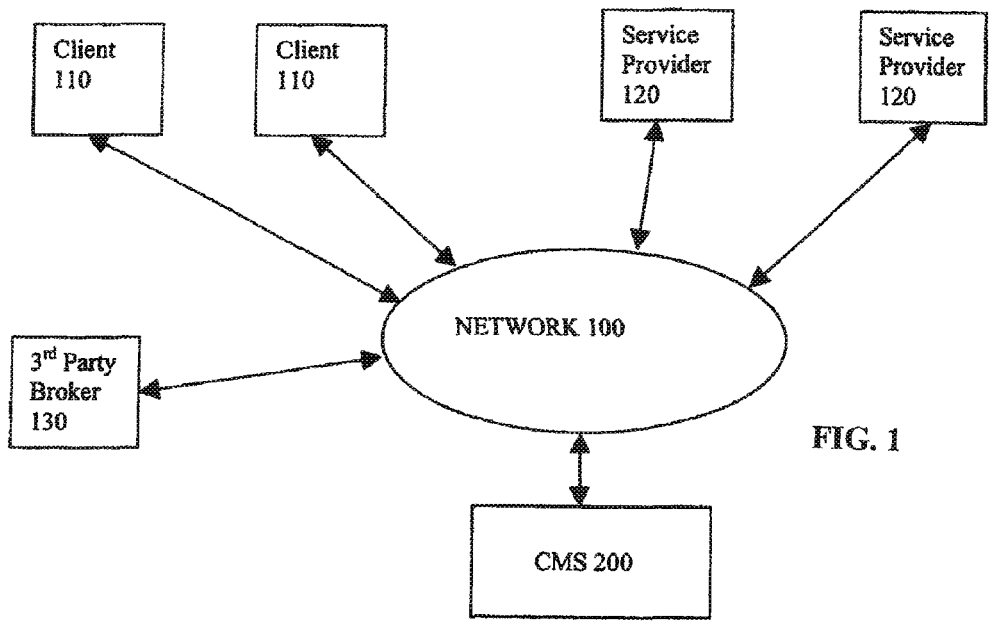
FIG. 1 is a block diagram of a communications network, specifically the Internet, which incorporates the commission management system (CMS) in accordance with an embodiment of the present invention.

The present invention is readily implemented using presently available communication apparatuses and electronic components. The invention finds ready application in virtually all communications systems, including but not limited to intranet, local area network (LAN), wireless LAN (WLAN), wide area network (WAN), Internet, private or public communication networks, wireless networks, satellite networks, cable networks or other online global broadcast networks.

In soft dollar arrangements, an investment adviser selects the brokers that will execute trades and provide research and other services to the adviser. In contrast, in a directed brokerage arrangement, a client asks its adviser to direct commission business to a particular broker that has agreed to provide services, pay obligations or make cash rebates (i.e., commission recapture) to the client.

Under a directed brokerage arrangement, while the adviser makes investment decision for the client, the client (often a qualified plan sponsor on behalf of the plan) selects the broker that will execute the client's trades in return for services from brokers. Unlike the soft dollar arrangements, the advisers do not receive products or services in a directed brokerage arrangement (i.e., commission recapture), but advisers' clients receive the products, services or cash rebates generated by their commissions.

It is appreciated that soft dollar credits or commission recaptures can be used in variety of securities transactions, including but not limited to: fixed-income, listed equities, OTC equities, foreign equities, options, syndicate, futures contracts, ADRs, new issues/secondary offerings, and the like. Also, brokerage firms can provide soft dollar credits on agency basis.

Some financial institutions, such as The Bank of New York Company (BNY), own a number of institutional agency brokerage firms that focus their resources on developing trading expertise and providing trading services. The clients of these institutional agency brokerage firms are typically money managers who represent end-clients like mutual funds and pension funds. The agency brokerage firms typically choose to focus their capital and expertise on execution (trading) services rather than on in-house research departments. In accordance with an embodiment of the present invention, the commission management system enables these agency brokerage firms to efficiently manage their various soft dollar and commission recapture arrangements over a communications network.

The agency brokerage firms can provide a variety of products and services to advisers via third party research providers or vendors including pricing service, news services, portfolio management, accounting, equity analysis, fixed-income analysis and the like. Section 28(e) affords safe harbor protection for research and related services paid for with commission on agency transaction in securities.

For example, a mutual fund hires a money manger or adviser, such as Smart Money Management, to manage a number of retail mutual funds. Smart Money employs research analysts to make investment decisions for its clients. The research analysts have a high demand for information and opinions about companies to invest in. Smart Money has a choice between two different types of brokerage firms who compete to execute its analysts' decisions: full service brokerage and agency brokerage firms.

In the exemplary application of the present invention, the agency brokerage firm charges six cents commission but does not provide any in-house research. Instead, the agency brokerage firm negotiates an arrangement with Smart Money that stipulates that four cents of the total six cents paid in commission will be held in an "soft dollar" account at the agency brokerage firm on Smart Money's behalf for investment or research related expenses. Alternatively, the client utilizes another brokerage firm, which also charges six cents commission, to execute trades. The other brokerage firm provides four cents of the total six cents paid in commission to the agency brokerage firm to be credited to the soft dollar account at the agency brokerage firm on Smart Money's behalf for investment related expenses. These accumulated "soft dollars" is used by the agency brokerage firm to pay for the provision of third-party research to assist Smart Money's analysts in the investment decision. Generally, the agency brokerage firm contracts with independent researchers, market data vendors, etc. to provide products and services to Smart Money. The bills for such services utilized by Smart Money are then paid by the agency brokerage firm from Smart Money's soft dollar account upon approval by Smart Money that the bill is valid and appropriate. The agency brokerage firm reports to Smart Money the balance and activity in the soft dollar account on a periodic basis, such as quarterly or monthly basis. It is appreciated that this all takes place in an environment highly regulated by the Securities and Exchange Commission (SEC) that requires both the agency brokerage firm and Smart Money to carefully evaluate, approve, and document what is purchased with soft dollars.

The SEC recognizes that the commissions paid by a money manager to a broker are the property of the end client—the fund, pension plan or pool of investors on whose behalf the manager is acting. Consequently, it allows institutional investors with a low demand for research (typically pension plans) to enter into arrangements where the research or "soft" component of the commission is returned directly to the plan rather than used for buying products or services. Such arrangements are commonly referred to as a directed brokerage or commission recapture arrangement.

In accordance with an embodiment of the present invention, a system is provided to manage the soft dollar commission. The inventive system enables clients to purchase third-party research product/services or investment services and to view and approve charges for such purchase. Additionally, the inventive system stores or documents clients' purchases and charges associated with such purchases, and facilitates soft dollar payment of approved charges to the appropriate third-party research provider.

In accordance with an embodiment of the present invention, the inventive system interfaces with any commission management/accounting system to extract the requisite information (or statement) to prepare and present the invoice (or bill) to the client for its purchases of the soft dollar products/services. In accordance with an aspect of the present invention, the inventive system monitors the commission accounting system for pre-determined events and extracts information from the commission accounting system upon an occurrence of pre-determined event.

Turning now to FIG. 1, there is illustrated a block diagram of a communications network 100, specifically the Internet, which incorporates the commission management system (CMS) 200 in accordance with an embodiment of the present invention. The commission management system 200 of an agency brokerage firm is connected to computers, servers, databases, networks, and the like of various clients 110, research/investment service providers 120 and third party brokers 130 over the communications network 100.

In an application of the present invention, the agency brokerage firm generally has contractual relationship with many research/investment service providers 120 so it can provide such products and services to its clients, e.g., money mangers, advisers, and the like. For example, the investment service providers 120 can provide, various research/investment products and/or services, such as computer terminals (i.e., Bloomberg terminals), investment advice, market feeds, research reports, etc. The clients 110, i.e., money managers, advisers and end-clients, can access the CMS 200 over the communications network 100 to purchase one or more investment services/products of various investment service providers 120 from the agency brokerage firm using their soft dollar commission accounts. In accordance with an embodiment of the present invention, the CMS 200 is an Internet portal or an application residing on a web server that can be accessed by the clients 110 and the investment service providers 120 over the Internet 100.

Figure 2:
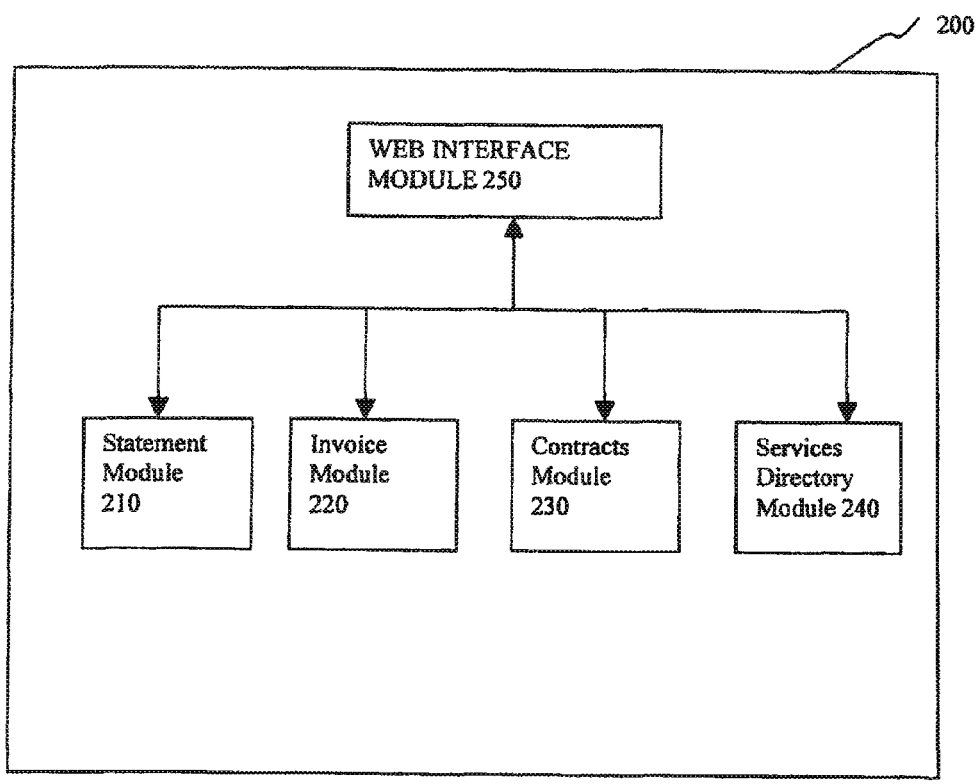
FIG. 2 is a block diagram of the commission management system of FIG. 1 in accordance with an embodiment of the present invention.
Figure 3:
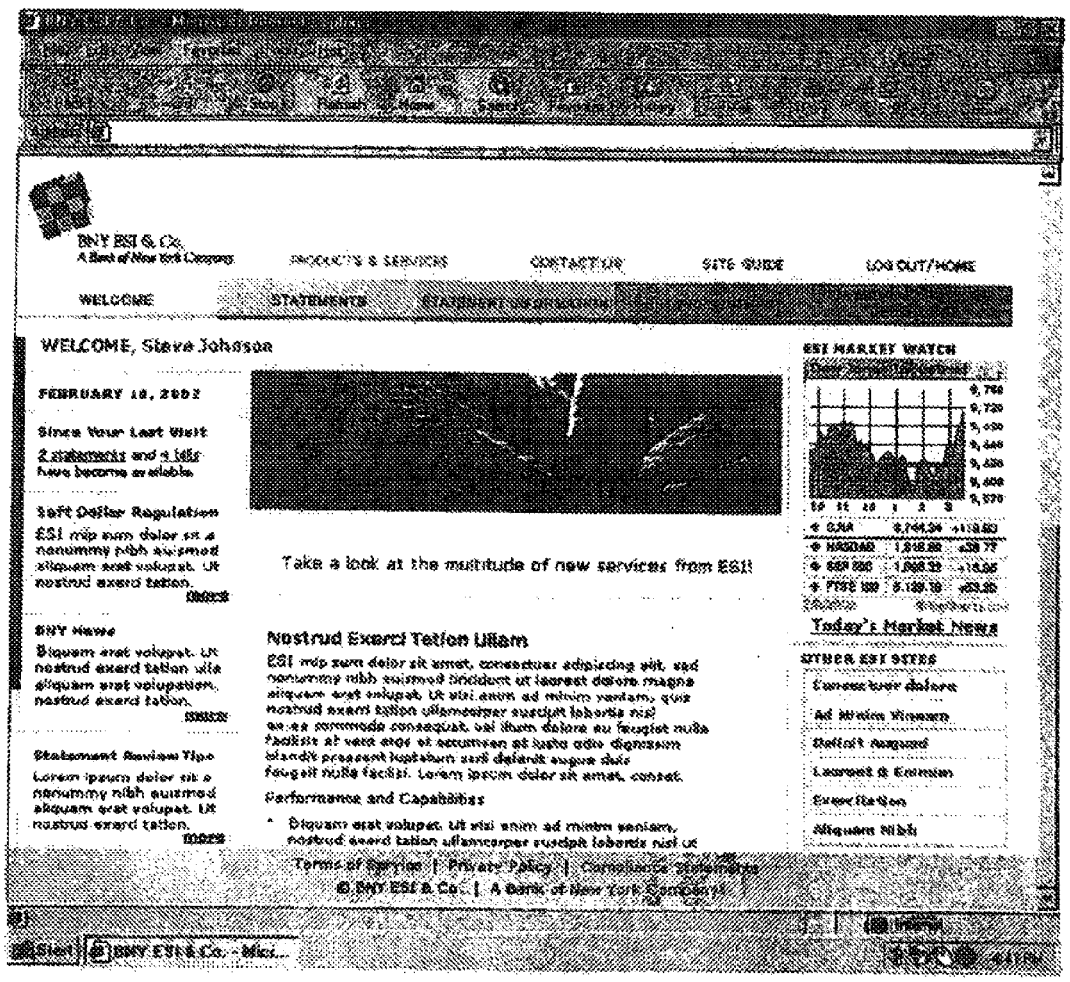
FIG. 3 is an exemplary screen shot of the CMS portal home page in accordance with an embodiment of the present invention.

Turning now to FIG. 2, there is illustrated a CMS 200 in accordance with an embodiment of the present invention. The CMS 200 comprises a client statement module 210, a client invoice module 220, a client contracts module 230, an investment services directory module 240, and a web interface module 250. The client 110 can access the CMS 200 of the present invention over the communications network 100. After the client 110 has been successfully verified by the CMS 200 using any security verification means, such as userid/password verification, the web interface module 250 displays an exemplary portal home page screen of FIG. 3. The portal home page has various navigational tabs to enable users to quickly access various modules of the CMS 200, such as the client statement module 210. As shown in FIG. 3, a section of the portal home page informs the client 110 of various information or data that needs their attention, such as new statements or invoices from the investment service providers 130. In accordance with an embodiment of the present invention, these data (invoices and/or statements) have hyperlinks to the appropriate page(s) in the CMS 200 to enable the client to view and attend to the information, such as approving invoices. Another section of the portal home page can provide market data, informative updates regarding the agency brokerage firm's business, and the like.

Figure 5:
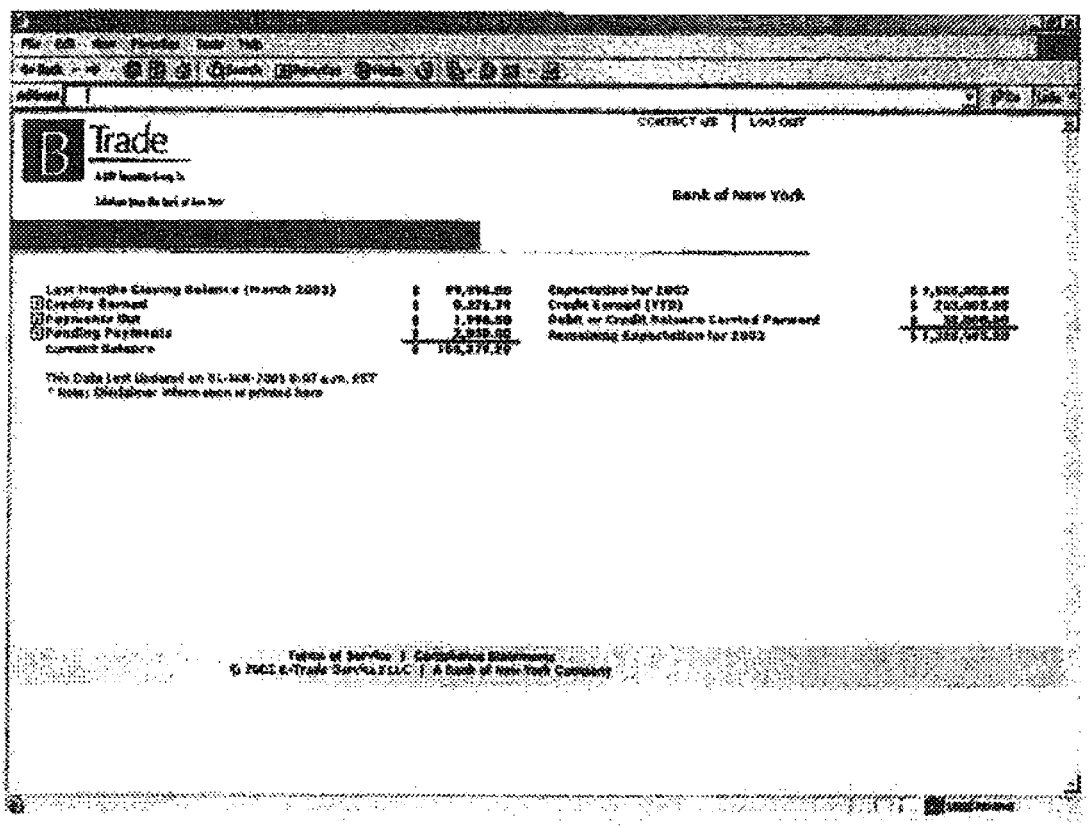
FIG. 5 is an exemplary screen shot of a current account status screen of the client statement module 210 in accordance with an embodiment of the present invention.

The client statement module 210 periodically (such as monthly, quarterly, etc.) generates and provides soft dollar commission statements (or commission recapture statements) dynamically to the clients 110 through the web interface module 250 as shown in FIG. 5 or downloadable files, such as Adobe Acrobat PDF (.pdf) files, which can be retrieved by the clients 110 through the web interface module 250. Also, as shown in FIG. 5, the clients 110 can view their current account status (i.e., obtain a "snapshot" of their account) online by accessing the client statement module 210 via web interface module 250 over the communications network 100. It is appreciated that the client statement module 210 can interface with any known or proprietary commission management/accounting system to extract the necessary information to generate the soft dollar commission statement. As shown in FIG. 5, the client can view the statements by month or by type (such as summary statement, detail statement, payment detail and trading detail). In accordance with an embodiment of the present invention, the clients 110 can select individual data elements to appear in their statement. That is, the client statement module 210 generates or calculates the client statements based on the data elements selected by the client 110.

Figure 6:
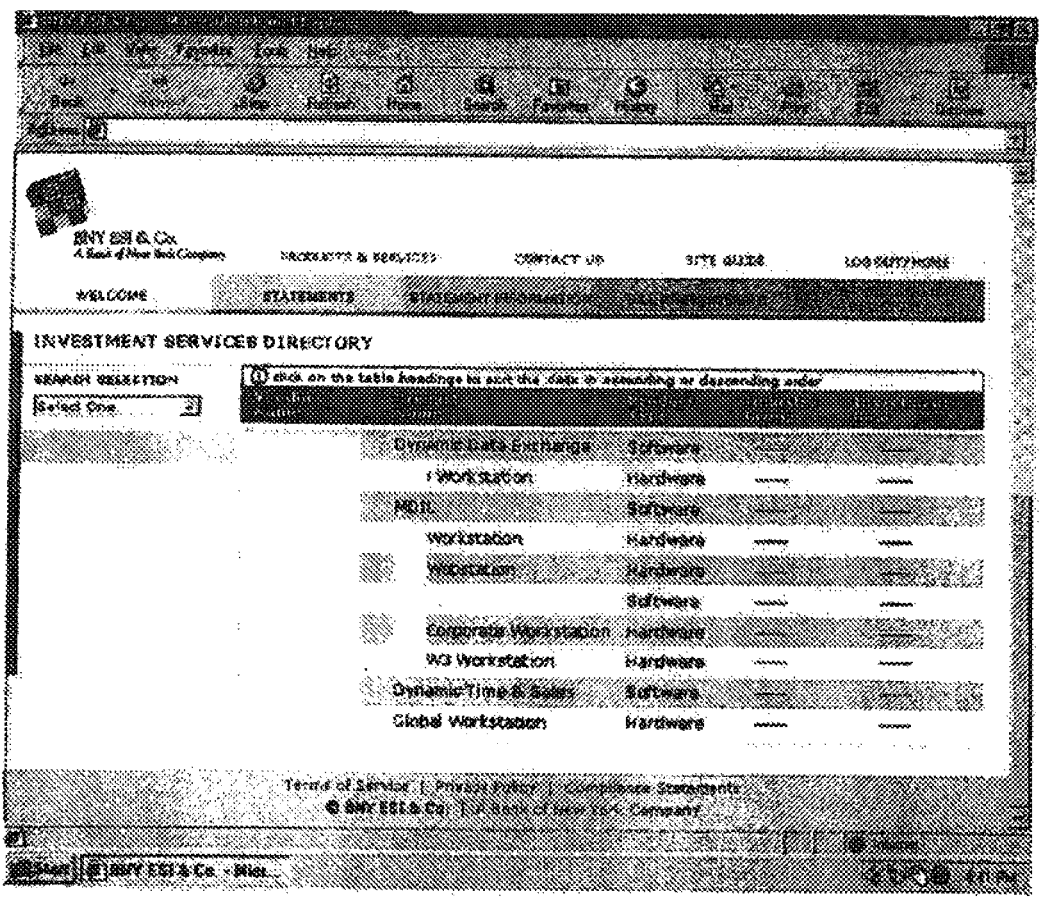
FIG. 6 is an exemplary screen shot of a investment services list screen of the investment services directory module 240 in accordance with an embodiment of the present invention.

As shown in FIG. 6, the investment services directory module 240 provides a directory of investment services/products from various investment services providers 120 that can be purchased using the soft dollar commissions by the clients 110. The directory can provide information about the investment products/services and/or the investment service provider, such as description of the product/service, vendor contact information, description of the vendor, cost of the product/service, etc. It is appreciated that the investment service provider 120 can access its records in the investment services module 240 over the communications network 100 to update or change any of its information, or add new products/services.

Figure 7:
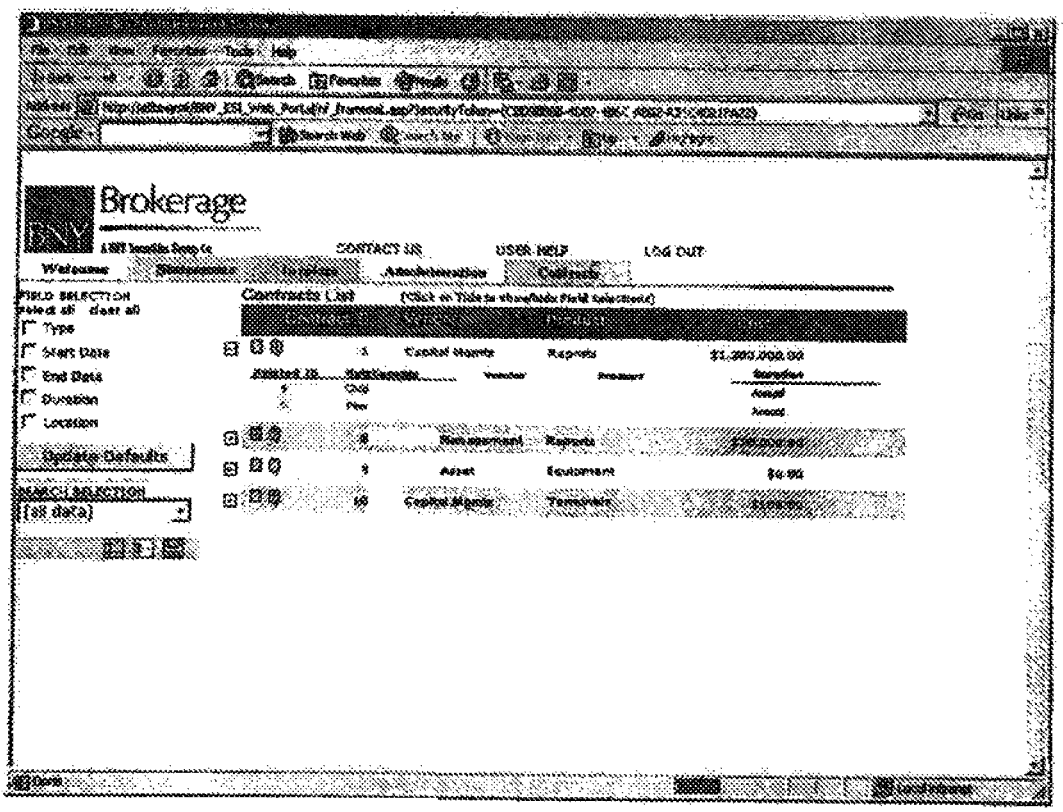
FIG. 7 is an exemplary screen shot of a contracts list screen of the client contracts module 230 in accordance with an embodiment of the present invention.
Figure 8:
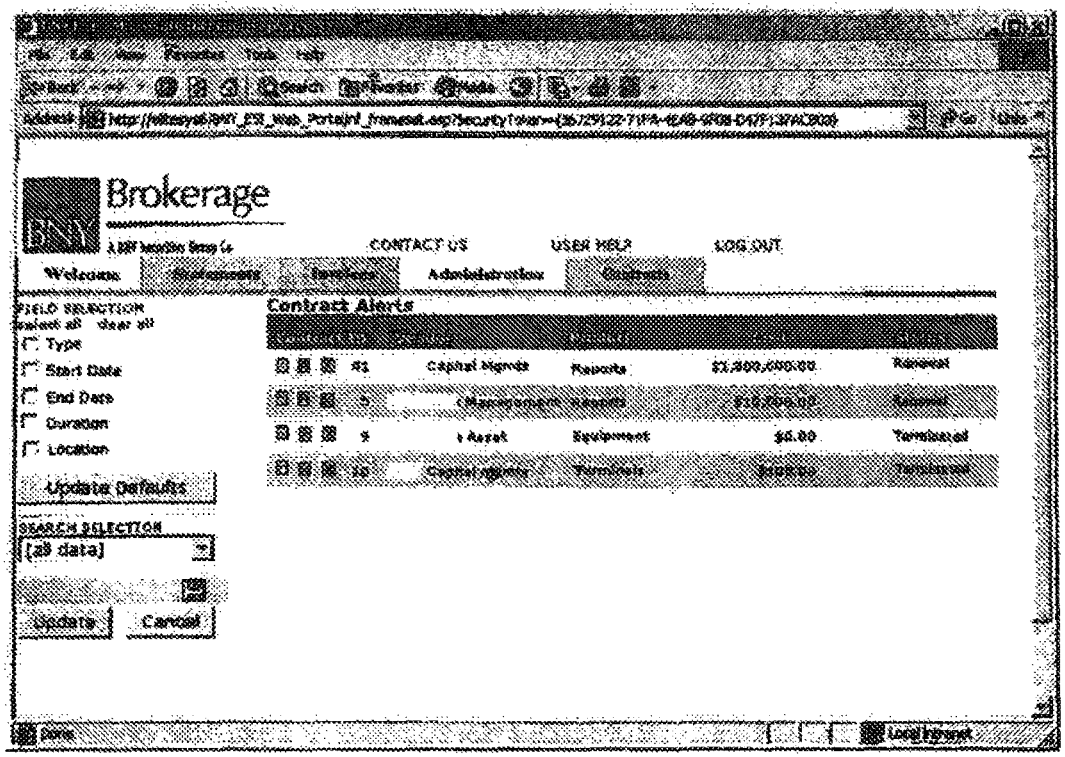
FIG. 8 is an exemplary screen shot of a contract alerts screen of the client contracts module 230 in accordance with an embodiment of the present invention.

When a client 110 selects a particular investment product/service to purchase, the investment service provider 120 offering such selected investment product/service sends the contract to the client 110. It is appreciated that the contract can be sent to the client 110 via any known means, such as electronically, by facsimile, mail, etc. Alternatively, the client 110 may agree to be supplied under (or sign onto) an existing agreement between the agency brokerage firm and the investment service provider 120, e.g., the agency brokerage firm may have bulk hardware or software agreement with a particular investment service provider or vendor 120. The client contracts module 230 receives and stores all executed contracts. The client contracts module 230 can receive the executed contracts electronically or can scan the hard copy of the executed contracts received via mail, facsimile and the like. As shown in FIG. 7, the clients 110 can view or download copies of their executed contracts with various investment service providers 120 by accessing the client contracts module 230 via the web interface module 250 over the communications network 100. In accordance with an embodiment of the present invention, the clients 110 can select individual data elements to appear in their contract list screen. That is, the client contracts module 230 displays the contracts list based on the data elements selected by the client 110. Additionally, in accordance with an embodiment of the present invention, the client contracts module 230 generates a contract alert page for a given client as shown in FIG. 8 displaying all contracts that are up renewal or have terminated and require client's attention.

Figure 9:
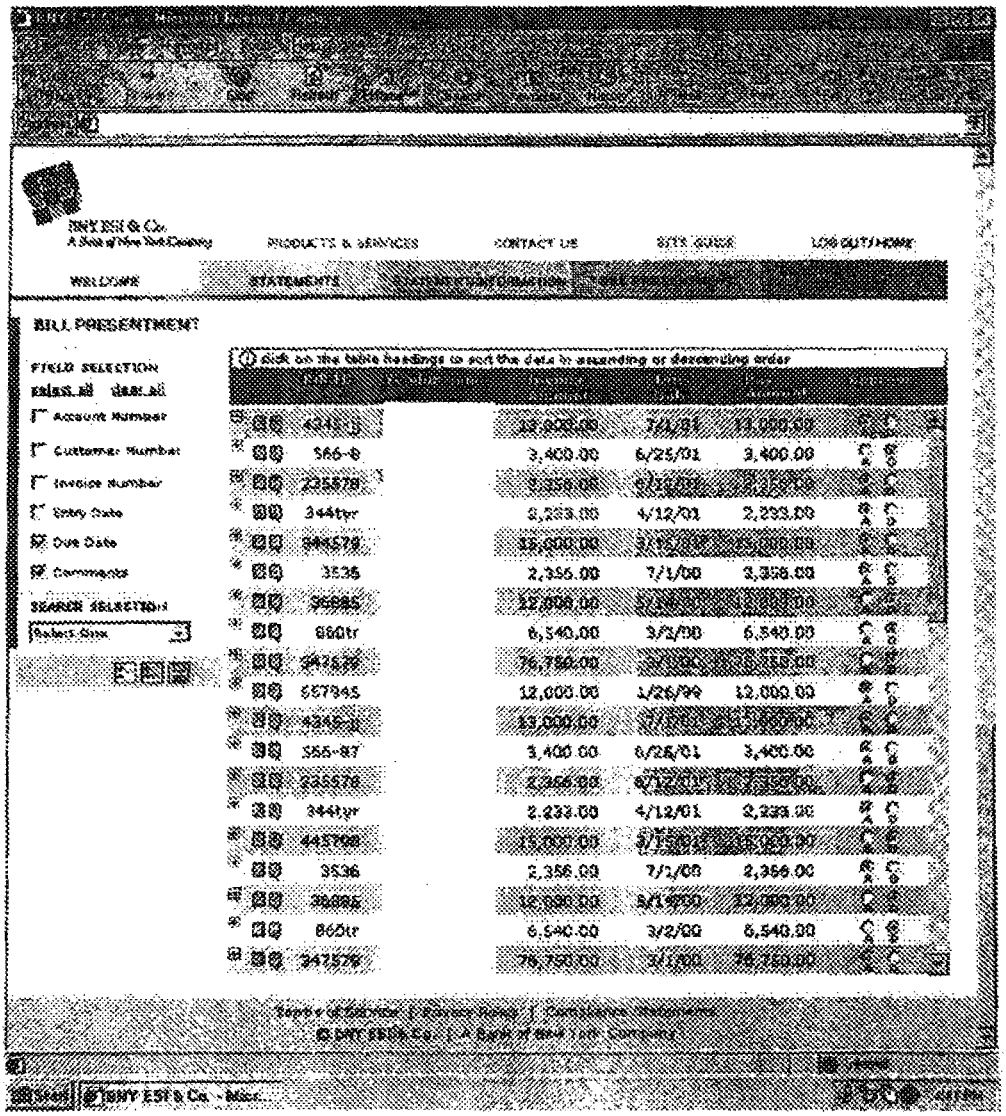
FIG. 9 is an exemplary screen shot of a bill or invoice presentment screen of the client invoice module 220 in accordance with an embodiment of the present invention.

After a client 110 has purchased one or more investment products/services offered by various investment service providers 120 through the CMS 200, the client invoice module 220 receives invoices from the investment service providers 120 on behalf of the purchasing clients 110 and presents the invoices to the clients 110 for approval. Upon receipt of an invoice on behalf of a client 110, the client invoice module 220 notifies the client 110 of the invoice electronically, such as email, instant messaging, etc. As shown in FIG. 9, the client 110 can view, approve or download copies of the invoices by assessing the client invoice module 220 via the web interface module 250 over the communications network 100. It is appreciated that upon approval of the invoices by the client 110, the agency brokerage firm then initiates steps to pay the approved invoices from client's soft dollar commission account. Also, the client 110 can select an invoice to obtain additional information about the invoice, such as the commitment information and attach comments directed to the investment service provider 120 and/or the agency brokerage firm. In accordance with an embodiment of the present invention, the client may edit an invoice to optionally approve only a portion of the invoice.

Figure 4:
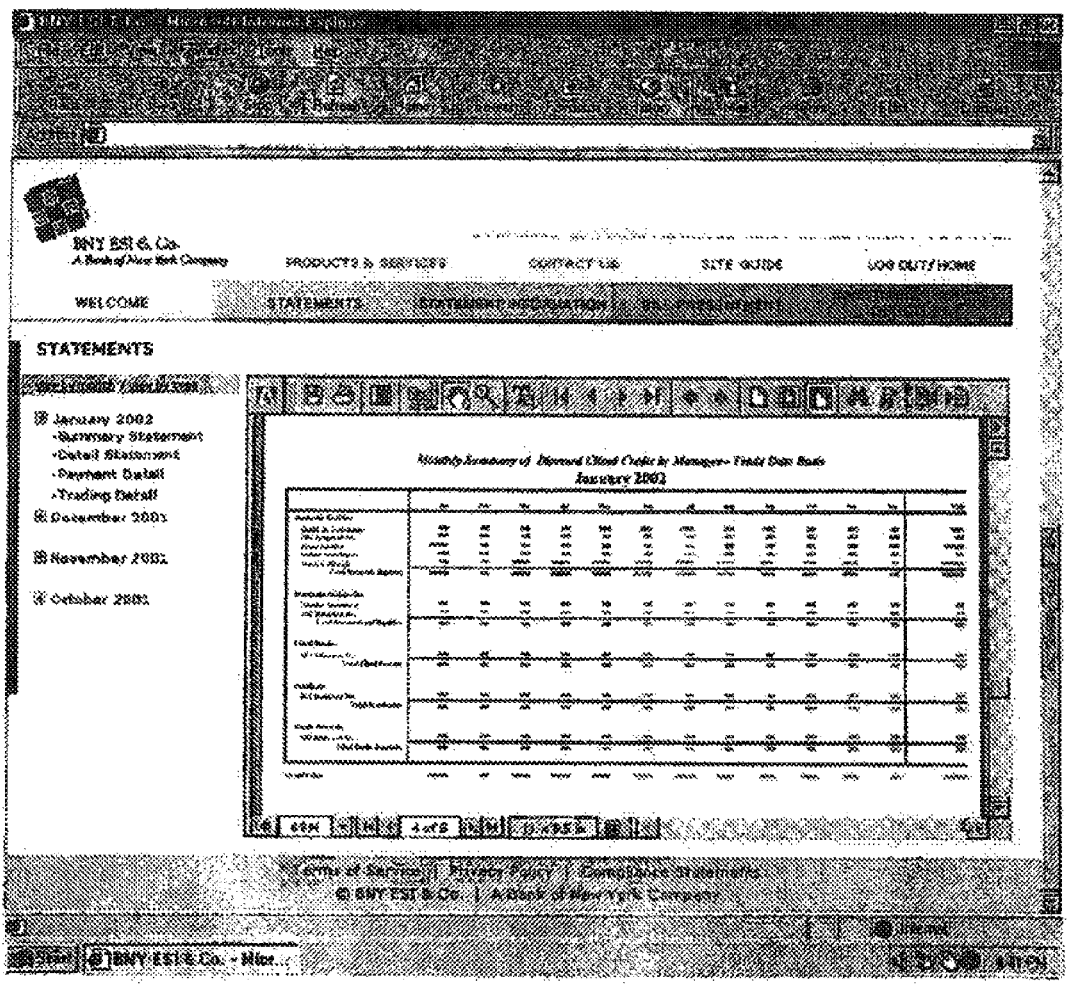
FIG. 4 is an exemplary screen shot of a client statement screen of the client statement module 210 in accordance with an embodiment of the present invention.
Figure 10:
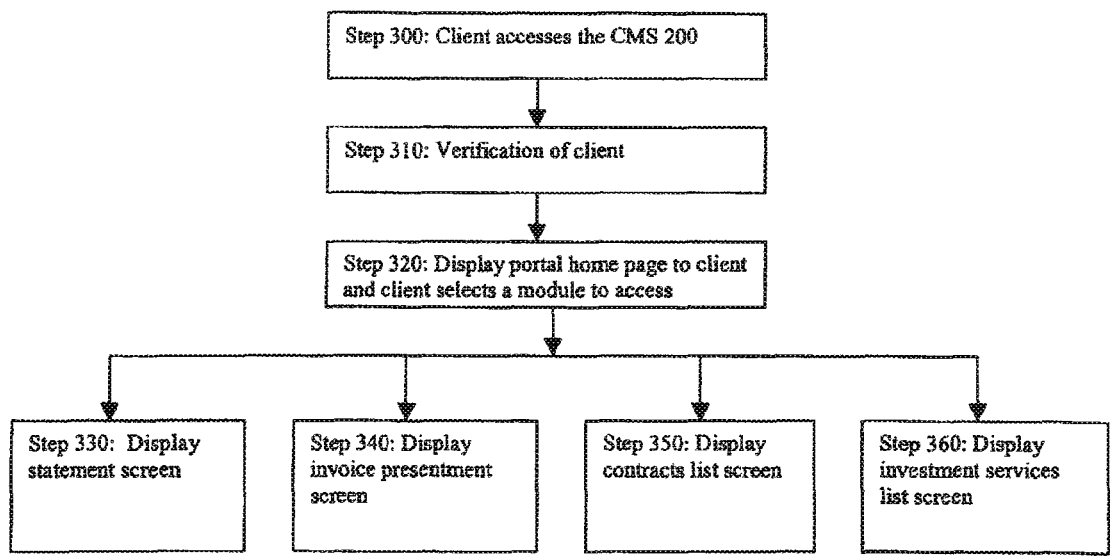
FIG. 10 is a flow chart of detailing the process of managing soft dollar commission in accordance with an embodiment of the present invention.

The process of managing soft dollar commission (and/or commission recapture) arrangements in accordance with an embodiment of the present invention is now described in conjunction with FIGS. 2 and 10. The client 110 accesses the CMS 200 over the communications network 100 in step 300. The CMS 200 verifies the client as being authorized to access the various modules of the CMS 200 in step 310. Upon successful verification of the client, the CMS 200 displays the portal home page of FIG. 3 to the client in step 320, thereby enabling the client 110 to select the desired task or navigate to one of the modules to view statements, directory of investment products/services, invoices, and contracts. If the client 110 selects the client statement module 210 in step 320, then the client statement module 210 displays the client statement screen of FIG. 4 in step 330, thereby enabling the client 110 to view its monthly summary statement. Alternatively, the client statement module 210 displays the current account status screen of FIG. 5 in step 330, thereby enabling the client 110 to view its current account status.

If the client 110 selects the client invoice module 220 in step 320, then the client invoice module 220 displays the invoice presentment screen of FIG. 9 in step 340, thereby enabling the client 110 to view and approve invoices from the various subscribed investment service providers 120.

If the client 110 selects the client contracts module 230 in step 320, the client contracts module 230 displays the contracts list screen of FIG. 7 in step 350, thereby enabling the client to view its executed contracts with various investment service providers 120.

If the client 110 selects the investment services directory module 240 in step 320, the investment services directory module 240 displays the investment services list screen of FIG. 6 in step 360, thereby enabling the client 110 to view all of the investment products/services available from various investment service providers 120.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A non-transitory computer readable medium comprising computer executable code for managing soft dollar commission accounts of a plurality of clients, said computer executable code comprising instructions for:
   providing access to a processor based server to a plurality of client devices by a web interface module of said server over said communications network;
   uploading to said server by a client invoice module of said server invoices received from a plurality of investment service providers for investment products/services purchased by said plurality of clients;
   notifying a client device associated with a client by said client invoice module to approve an invoice received from an investment service provider for an investment product/service purchased by said client;
   processing said invoice by a processor of said server if an approval to pay said invoice was received by said client invoice module from said client; and
   pooling soft dollar commissions by said processor from any of a plurality of brokerage firms associated with said client to authorize payment of said invoice received from said investment service provider for said client.

2. The computer readable medium of claim 1, further comprising instructions for:
   connecting said client device associated with said client to said client invoice module by said web interface module if said client selects to view or approve an invoice;
   presenting said invoice for viewing by said client invoice module on said client device associated with said client; and
   requesting the approval to pay from said client by said client invoice module if said invoice requires approval from said client.

3. The computer readable medium of claim 1, further comprising instructions for providing access to said client by a client statement module of said server to view soft dollar commission statements from said plurality of brokerage firms associated with said client.

4. The computer readable medium of claim 3, further comprising instructions for:
   connecting said client device associated with said client to said client statement module by said web interface module if said client selects to view a soft dollar commission statement from a brokerage firm associated with said client; and
   presenting said soft dollar commission statement for viewing by said client statement module on said client device associated with said client.

5. The computer readable medium of claim 4, further comprising instructions for interfacing with a separate commission or accounting system by said client statement module to provide access to said client to said soft dollar commission statement from said brokerage firm associated with said client.

6. The computer readable medium of claim 1, further comprising instructions for notifying said client device associated with said client by said client invoice module to approve an invoice received from an investment service provider for an investment product/service purchased by said client if said investment services module determines there is no account record between said investment service provider and said client.

7. The computer readable medium of claim 6, further comprising instructions for establishing an account record between said investment service provider and said client by said investment services module when said client invoice module receives said client approval to pay said invoice received from said investment service provider.

8. A computer server for managing soft dollar commission accounts of a plurality of clients over a communications network, comprising:

said server configured to display a web interface module to provide access to said server from a plurality of client devices over said communications network, each client device being associated with a client;

said server configured to display a client invoice module to:
upload to said server invoices received from said plurality of investment service providers for investment products/services purchased by said plurality of clients; and
notify said client device associated with said client to approve an invoice received from an investment service provider for an investment product/service purchased by said; and a processor associated with said server to:
process said invoices received by said client invoice module from said plurality of investment service providers if an approval to pay said invoice was received by said client invoice module from said client; and
pool soft dollar commissions from any of a plurality of brokerage firms associated with said client to authorize payment of said invoice received from said investment service provider for said client.

9. The server of claim 8, wherein said web interface module connects said client device associated with said client to said client invoice module if said client selects to view or approve an invoice; and wherein said client invoice module presents said invoice for viewing on said client device associated with said client and requests the approval to pay from said client if said invoice requires approval from said client.

10. The server of claim 8, further comprising a client statement module for providing access to said client to view soft dollar commission statements from said plurality of brokerage firms associated with said client.

11. The server of claim 10, wherein said web interface module connects said client device associated with said client to said client statement module if said client selects to view a soft dollar commission statement from a brokerage firm associated with said client; and wherein said client statement module presents said soft dollar commission statement for viewing on said client device associated with said client.

12. The server of claim 11, wherein said client statement module interfaces with a separate commission or accounting system to provide access to said client to said soft dollar commission statement from said brokerage firm associated with said client.

13. The server of claim 8, wherein said client invoice module notifies said client device associated with said client to approve an invoice received from an investment service provider for an investment product/service purchased by said client if said investment services module determines there is no account record between said investment service provider and said client.

14. The server of claim 13, wherein said investment services module establishes an account record between said investment service provider and said client when said client invoice module receives said client approval to pay said invoice received from said investment service provider.

\* \* \* \* \*